United States Patent
Akremi et al.

(10) Patent No.: US 12,104,723 B2
(45) Date of Patent: Oct. 1, 2024

(54) PROFILE CLAMP WITH LATCHING TAB

(71) Applicant: NORMA Germany GmbH, Maintal (DE)

(72) Inventors: Belal Akremi, Newbury (GB); Mateusz Jarosz, Newbury (GB); Tatjana Rumbauskiene, Newbury (GB); Manuel Baudoin, Newbury (GB)

(73) Assignee: Norma Germany Gmbh, Maintal (DE)

( * ) Notice: Subject to any disclaimer, the term of this patent is extended or adjusted under 35 U.S.C. 154(b) by 56 days.

(21) Appl. No.: 17/765,044

(22) PCT Filed: Sep. 29, 2020

(86) PCT No.: PCT/EP2020/077164
§ 371 (c)(1),
(2) Date: Mar. 30, 2022

(87) PCT Pub. No.: WO2021/063908
PCT Pub. Date: Apr. 8, 2021

(65) Prior Publication Data
US 2022/0397218 A1  Dec. 15, 2022

(30) Foreign Application Priority Data
Oct. 1, 2019 (DE) ............... 10 2019 126 484.7

(51) Int. Cl.
*F16L 23/08* (2006.01)

(52) U.S. Cl.
CPC .......... *F16L 23/08* (2013.01); *F16L 2201/10* (2013.01)

(58) Field of Classification Search
CPC ................................ F16L 23/08; F16L 23/04
See application file for complete search history.

(56) References Cited

U.S. PATENT DOCUMENTS

| 7,399,005 B2 | 7/2008 | Rigollet et al. |
| 9,016,731 B2 | 4/2015 | Rigollet |

(Continued)

FOREIGN PATENT DOCUMENTS

| CN | 103069204 A | 4/2013 |
| DE | 102014002659 A1 | 8/2015 |

(Continued)

OTHER PUBLICATIONS

German Office Action for German Application No. 10 2019 126 484.7 dated Apr. 7, 2020 (5 pages).

(Continued)

*Primary Examiner* — Zachary T Dragicevich
*Assistant Examiner* — James A Linford
(74) *Attorney, Agent, or Firm* — REISING ETHINGTON, P.C.

(57) ABSTRACT

A profile clamp with a clamp band and an annular ring element with a ring body is provided. The clamp band has two clamping heads which are connected to one another via a clamping element. The ring element includes at least one first latching tab, which is arranged projecting from the ring body in the axial direction of the profile clamp and projecting out of the profile clamp at least in some sections. The first latching tab has a first latching portion and a free-swinging portion extending opposite thereto. The first latching portion is designed to exert a force, and the first latching portion has a first contact edge that is designed to create a point contact or a line contact with a flange of the pipe end.

12 Claims, 5 Drawing Sheets

(56) References Cited

U.S. PATENT DOCUMENTS

| | | | |
|---|---|---|---|
| 10,228,084 B2 | 3/2019 | Vosgeois et al. | |
| 10,794,518 B2 | 10/2020 | Wu et al. | |
| 2017/0254454 A1* | 9/2017 | Vosgeois | F16L 23/08 |
| 2018/0094755 A1* | 4/2018 | Rigollet | F16L 23/20 |
| 2020/0141525 A1* | 5/2020 | Drivon | F16L 23/003 |

FOREIGN PATENT DOCUMENTS

| | | | |
|---|---|---|---|
| DE | 102017121994 A1 | 3/2019 | |
| EP | 3217059 A1 | 9/2017 | |
| KR | 20130095743 A | 8/2013 | |
| WO | WO03048624 A1 | 6/2003 | |
| WO | WO2012013891 A1 | 2/2012 | |
| WO | WO-2020065276 A1 * | 4/2020 | F16B 7/0406 |

OTHER PUBLICATIONS

International Search Report for International Application No. PCT/EP2020/077164 dated Jan. 11, 2021 (4 pages).
English Translation of International Search Report for International Application No. PCT/EP2020/077164 dated Jan. 11, 2021 (2 pages).
Chinese Office Action for Chinese Application No. 202080064971.6 dated Apr. 6, 2023 (11 pages).
Korean Office Action for Korean Application No. 10-2022-7014674 dated Dec. 27, 2023 (6 pages).
English Translation of Korean Office Action for Korean Application No. 10-2022-7014674 dated Dec. 27, 2023 (5 pages).

* cited by examiner

PROFILE CLAMP WITH LATCHING TAB

INTRODUCTION

The disclosure relates to a profile clamp with a latching tab.

A clamp, such as a profile clamp, can be used, for example, for the fluid-tight connection of two pipe ends or two flanges that are equipped with flanges pointing radially outwards. For this purpose, the flanges are positioned relative to each other and the profile clamp with a tensionable, usually two- or multi-part clamp band is placed on the flanges. The connection is fixed by tensioning the profile clamp, with axial and radial retaining forces acting on the flanges. A clamp band of the profile clamp usually has a U-shaped or V-shaped cross-section for this purpose, which comes into area contact with the flanges.

To achieve the desired sealing, a ring element with an annular sealing area is often inserted between the flanges, which comes into axial surface contact with both flanges, the sealing effect being achieved by tensioning the flanges.

Profile clamps with a clamp band and an annular ring element with a ring body are known, which are used to connect two pipe ends or flanges. The clamp band usually comprises two tensioning heads which are or can be connected to each other via a tensioning element.

For an ideal sealing, it is often necessary that the ring element is precisely aligned with respect to the flanges. If the ring element is separate and not attached to the clamp or a flange, a user must handle the clamp, the ring element and the pipes to be joined at the same time, making installation of the clamp more difficult. Before joining the pipe ends, the pipe ends can be pre-positioned, which is mostly done manually and which is cumbersome. For this purpose, various locking elements can be arranged on the ring element to clamp the flange. Pre-positioning means that at least one, preferably both, flanges are clamped to the ring element, but the clamp band is not yet tensioned.

Such a profile clamp is known, for example, from EP 1 451 498 A1 and is used to connect two pipe ends. The clamp disclosed there has a clamp band and an annular ring element arranged inside the clamp band. The clamp has two tensioning heads which are connected to each other by a screw as a tensioning element. The ring element comprises fastening clips projecting in the axial direction of the clamp for fastening the ring element to the clamp. The fastening clips are bent over such that their ends opposite the ring element rest on an inner surface or outer circumferential surface of the clamp. In other words, the ends of the fastening clips interact with the clamp band. However, that interaction is disadvantageous and undesirable, as explained below. Some fastening clamps have a tongue for clamping a respective pipe end, which engages behind the pipe end. The pipe end is then irreversibly clamped between the tongue and an oppositely extending profile projection in the ring element. The clamp band disclosed therein has a plurality of relatively small tongues along its circumference for clamping. The large number of tongues means that the assembling user cannot clearly determine whether there is clamping between the clamp band and the flange, since all tongues must clamp for a secure seal. Due to the small tongues, it is also not possible to determine beyond doubt that individual tongues are stuck. The assembling user must therefore carry out a follow-up check after pre-positioning, which is cumbersome, time-consuming and cost-intensive.

SUMMARY

It is therefore an object according to an embodiment of the present disclosure to propose a profile clamp of the type mentioned above, which is simplified in terms of manufacturing effort and allows to recognize a pre-positioning that has been carried out without any doubt in a simple manner.

According to an embodiment, a profile clamp with a clamp band and an annular ring element with an ring body is proposed, the clamp band having two tensioning heads which are connected to one another via a tensioning element, the ring element comprising at least one first latching tab which is arranged projecting from the ring body in the axial direction of the profile clamp and protruding at least in sections from the profile clamp, wherein the first latching tab has a first latching section and a free-vibrating section extending in the opposite direction thereto, wherein the first latching section is configured to exert a force acting on a flange of a pipe end in the direction of the transverse central plane of the profile clamp, and the first latching section has a first contact edge which is configured to produce a point contact or line contact with the flange of the pipe end.

With the first latching tab, it is thus possible to pre-position a pipe end on the ring element during assembly or when connecting the two pipe ends, before the final tensioning of the clamp band, so that separate holding of the pipe end is not required anymore. The pipe end snaps into the ring element in a simple manner by insertion. The latching tab partially protrudes from the clamp band in such a way that the user can detect latching without any doubt. The point or line contact ensures sufficient hold in the axial direction and radial direction while at the same time minimizing the contact area.

The two pipe ends to be connected can, for example, be formed as a pair of a funnel end and a biconical end. Conceivably, the biconical end of the pipe may cooperate with the first latching tab. The ring member may include at least one retaining member for support within the clamp band. The ends of the pipe may also be connected via corresponding flanges.

According to a further development of the clamp according to an embodiment, the first latching section and the free-vibrating section are aligned with each other. Thus, no step or offset is formed between these elements, which allows a force flow to run unhindered and without deflection or vortex formation linearly from the first latching section to the free-vibrating section. A deformation or change in position of the latching section thus also directly leads to a deformation or change in position of the free-vibrating section, which can be recognized by the user without any doubt. The user may then easily determine whether the system is clamped securely.

According to an embodiment of the clamp, the first latching section is formed as a section, particularly as a stamped section, separated from the first latching tab. This makes it possible to create a monolithic first latching tab that can be manufactured inexpensively and can also be formed with the ring element monolithically.

According to a further development of the clamp according to an embodiment, the first latching section is formed in a barb-like manner. Alternatively, or additionally, the first latching section may be configured to act on the flange of the pipe end in the barb-like manner. A barb-like latching action results in a secure connection and, for example, in a reversible connection if the first latching tab and/or the first latching section are sufficiently deformable.

According to a further development of the clamp according to an embodiment, it is conceivable that the first contact edge is formed on one side or on both sides to merge into a radius. In this way, scratching or damage to the flange or pipe end by the first latching section can be avoided when the flange is rotated about a longitudinal center axis.

According to an embodiment of the clamp, the first latching tab is formed in such a way that the point contact or the line contact is the only contact between the first latching tab and the flange of the pipe end. As a result, the friction-causing contact surface and clamping area are reduced to a minimum and the detection of clamping is considerably simplified, since clamping takes place exclusively at the latching tab.

In an embodiment of the clamp, the free-vibrating section can project at least in sections radially outward. In this embodiment, at least the free end of the free-vibrating section is free in space or does not rest against the clamp band and does not interact with the latter, too. Thus, the free-vibrating section can serve as a guide element to center this pipe end in the direction of the ring element when inserting the pipe end. Advantageously, per an embodiment, the free-vibrating section can be arranged outside the clamp band to enable the earliest possible centering of the pipe end. In addition, latching can be very easily detected by deformation or change in position of the free-vibrating section.

According to an embodiment of the clamp, the first latching tab is pretensioned, preferably spring-loaded, radially outwards relative to the ring body. This pretension results in a secure and centering fit of the ring body in the clamp band and an centering effect due to the free-vibrating section. The first latching tab can rest against the clamp band in its inserted state in the clamp band. The clamp band can thereby pressurize the first latching tab in the direction of the longitudinal center axis against the spring force. At least the first latching tab may be made of a material capable of producing a suitable spring action. In addition, or alternatively, at least the first latching tab can achieve a spring effect through its geometric design.

According to a development of the clamp according to an embodiment, it is conceivable that the free-vibrating section is arranged and/or configured in such a way that it can freely swing at least when the flange of the pipe end is engaged with the first latching section and a perceptible engagement noise can be generated and/or amplified. The flange of the pipe end may abut against the first latching section during insertion and deform, bend, and/or stress the flange of the pipe end, depending on the embodiment thereof. When at least a portion of the flange passes the first latching section and latches therewith, the first latching section may immediately return to its original initial position, thereby generating an impact-like oscillation of the latching section. Since the free-vibrating section can oscillate freely in space, an engagement noise can be perceived. Advantageously, per an embodiment, when the clamp is correctly pre-positioned, it gives clear acoustic feedback and there is no longer any need for rechecking or readjustment.

Advantageously, per an embodiment, the profile clamp may further comprise a second latching tab arranged on the ring body and having a second latching section and a second contact edge, the second latching tab being arranged and/or configured to generate a perceptible latching noise at least when the flange of the pipe end is latched to the second latching section. It is conceivable that the funnel-shaped end of the pipe cooperates with the second latching tab and that it is pre-positioned thereon and held securely during a tightening of the profile clamp. Furthermore, provided that the first latching tab cooperates with the biconical end of the pipe, the at least one first latching tab projects from the ring body in the opposite direction along the longitudinal center axis than the at least one second latching tab. In this way, both ends of the pipe can be easily latched to the ring body.

It is also conceivable that the first latching tab and/or the second latching tab is/are configured in such a way that the perceptible latching noise exceeds the human hearing threshold, preferably lies in the range of music perceptibility, further preferably in the range of speech perceptibility, per various embodiments. In this regard, reference is made in particular to FIG. 5, which shows the aforementioned limits of music and speech perceptibility. The tabs can, for example, be configured such that the engagement noise generated is adapted to a usual ambient volume. For example, during the assembly of an exhaust line of a motor vehicle, the engagement noise must be able to be perceived reliably and unambiguously, in particular by the person carrying out the assembly on the assembly line.

A further development of the profile clamp according to an embodiment comprises at least three spaced first latching tabs on at least one side of the ring body with respect to the transverse center plane. It is conceivable that the ring body also comprises more than one second latching tab. More than one first latching tab allows the respective pipe end to be latched more securely, with three or four latching tabs allowing secure latching. More than four latching tabs do not significantly increase latching security, it has been found according to certain embodiments, but do increase the risk of non-latching, which would necessitate rechecking that shall be avoided. The number of latching tabs is related to the diameter of the pipe ends or flanges to be joined. It is conceivable that a larger diameter may require more than four latching tabs. However, three or four latching tabs are optimal with a flow cross-section of the pipe ends in the clamp area of about 4 cm to 8 cm.

A ring member having a ring body for a profile clamp is also proposed, the ring member comprising at least a first latching tab arranged to project from the ring body in the axial direction of the ring member, the first latching tab having a first latching section and a free swinging portion extending opposite thereto, wherein the first latching section is configured to exert a force acting in the direction of the transverse central plane of the ring member on a flange of a pipe end, and the first latching section has a first contact edge configured to make a point contact or line contact with the flange of the pipe end. The ring element has the advantages and beneficial effects per certain embodiments already described with respect to the profile clamp.

The disclosure further comprises a conduit connection arrangement having a conduit end formed with a flange on which a profile clamp is disposed.

BRIEF DESCRIPTION OF THE FIGURES

Further features, details and advantages of the invention are apparent from the wording of the claims and from the following description of embodiments based on the drawings. Showing:

The invention is not limited to any of the above-described embodiments but can be modified in a variety of ways.

DETAILED DESCRIPTION

Figure 1:
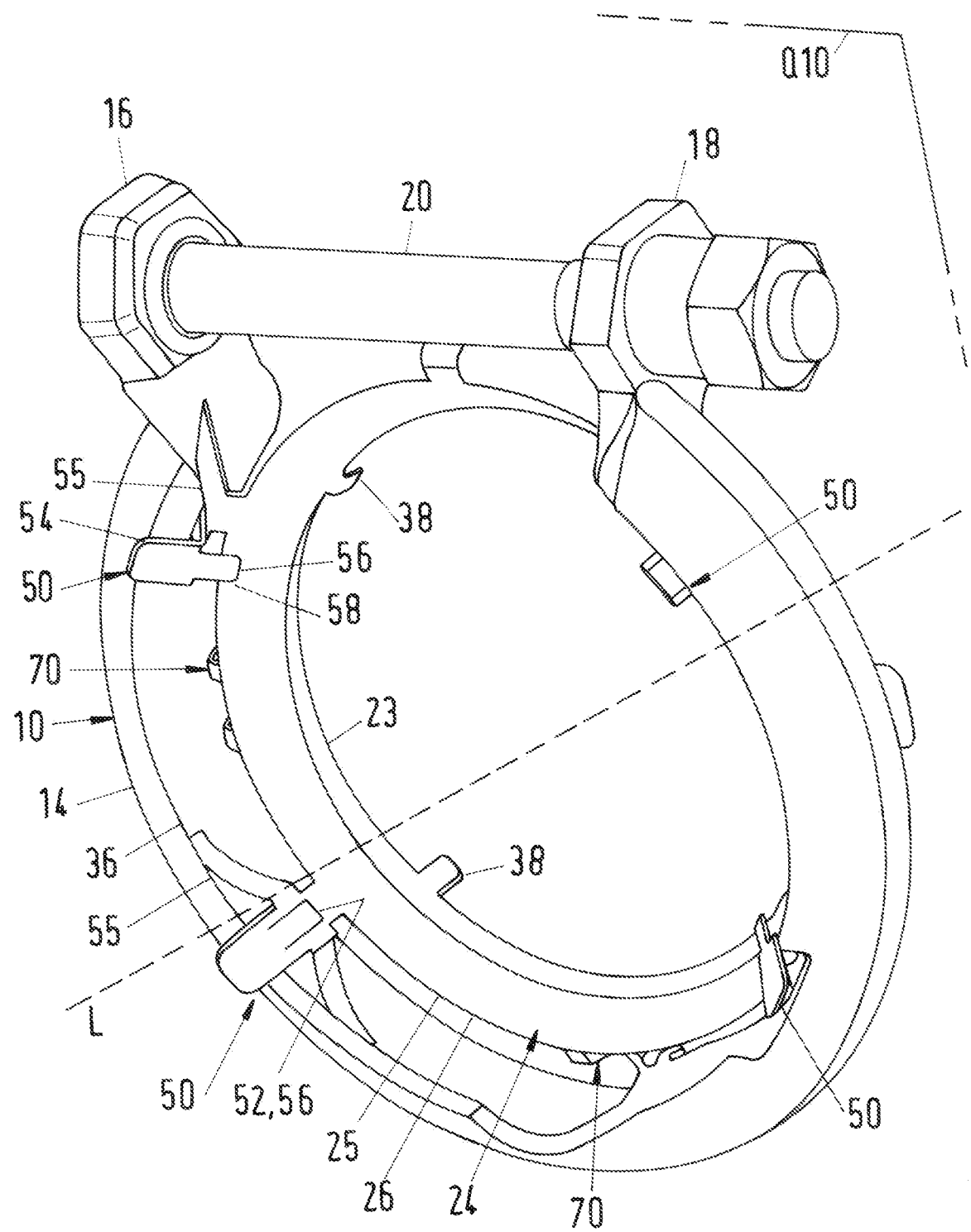
FIG. 1 a perspective view of a profile clamp according to an embodiment.

FIG. 1 shows a clamp 10 according to an embodiment, which is configured as a profile clamp and can be pre-positioned on a flange of a pipe end. It is shown in the open position, i.e. not tensioned and shown in the pre-assembled state, as it is delivered to the place of assembly. The clamp 10 has a clamp band 14 with two tensioning heads 16 and 18 or tensioning jaws, which are connected to each other via a tensioning element 20 and can be produced by bending over the ends of the clamp band 14. However, it is also conceivable to form the tensioning jaws, for example, by bending the ends of the clamp band into loops, with tensioning bolts being inserted into the loops. In this case, the profile of the clamp band can also deviate relatively strongly from the shape shown with a substantially V-shaped cross-section with two flanks inclined radially inwards from a flat inner side.

The clamp band 14 is shown as a single piece, but in an embodiment not shown it can also be divided into two profile halves which are connected to each other by a bridge element on a side opposite the tensioning heads 16 and 18. The clamp band 14 is penetrated by a transverse center plane Q10, in which the largest diameter of the clamp band 14 lies. A longitudinal central axis L penetrating the profile clamp is orthogonal to the transverse central plane Q10.

Figure 2:
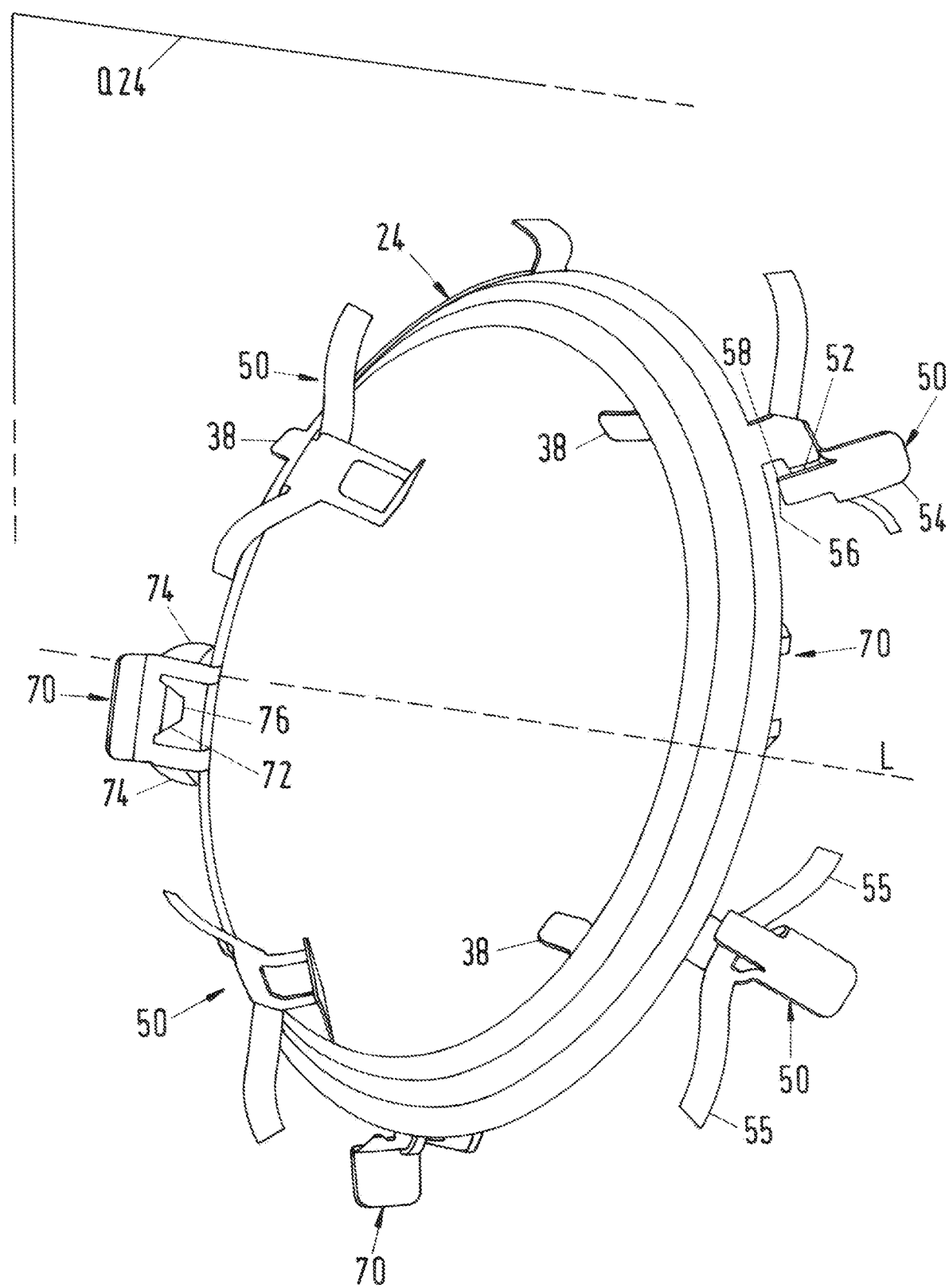
FIG. 2 a perspective view of a ring element according to an embodiment.

An exemplary annular ring element 24 with a ring body 26 is arranged within the clamp 10 and is shown in FIG. 2 in a stand-alone position. The ring element is penetrated centrally in its height with respect to the longitudinal center axis L by a transverse center plane Q24, which is arranged parallel to and spaced apart from the transverse center plane Q10. The ring element 24 comprises an outer edge 23, which faces away from the transverse central plane Q10, and an inner edge 25, which faces the transverse central plane Q10. The ring element 24 includes four first latching tabs 50, which are arranged to project from the ring body 26 in the axial direction of the profile clamp 10. The latching tabs 50 protrude, at least in sections, from the clamp band 14 of the profile clamp 10 and are monolithically formed with the ring body 26 and arranged at the inner edge 25 thereof. Three second latching tabs 70 are also monolithic and are arranged on the inner edge 25 on the ring body 26. The latching tabs 70 extend in the opposite direction with respect to the first latching tabs 50 along the longitudinal central axis L from the ring body 26.

Each first latching tab 50 is S-shaped in section and comprises a base section 51, which on the one hand merges into the ring body 26. On the other hand, it is adjoined by a retaining section 53 on which two retaining arms 55 are arranged symmetrically thereto in the circumferential direction. Each retaining arm 55 has a curved shape which is open radially outwardly area by area and radially inwardly area by area and forms a spring section. The distal end of each retaining arm 55 is configured to extend radially inwards. As a result, the distal end does not contact nor interact with an inner contour 36 of the clamp band 14. Rather, the radially outwardly curved central portion of the retaining arm 55 engages the inner contour 36. As a result, the ring element 24 and the clamp band 14 are symmetrically aligned with respect to each other and, if necessary, centrically aligned with respect to the longitudinal central axis L. In addition, the retaining arms 55 secure a suitable position of the ring element 24 during transport and assembly of the clamp. The retaining arms 55 extending in such a manner also result in an advantageous rotational capability of the ring element 24 in the clamp band 14. During tensioning of the clamp band 14, the latching tabs 50 can elastically spring in with the retaining arms 55, thereby ensuring their symmetrical relative position. An intermediate section 57 follows the retaining section 53 and a free-vibrating section 54 follows the intermediate section, the free-vibrating section also defining the distal end of the latching tab 50.

Figure 3:
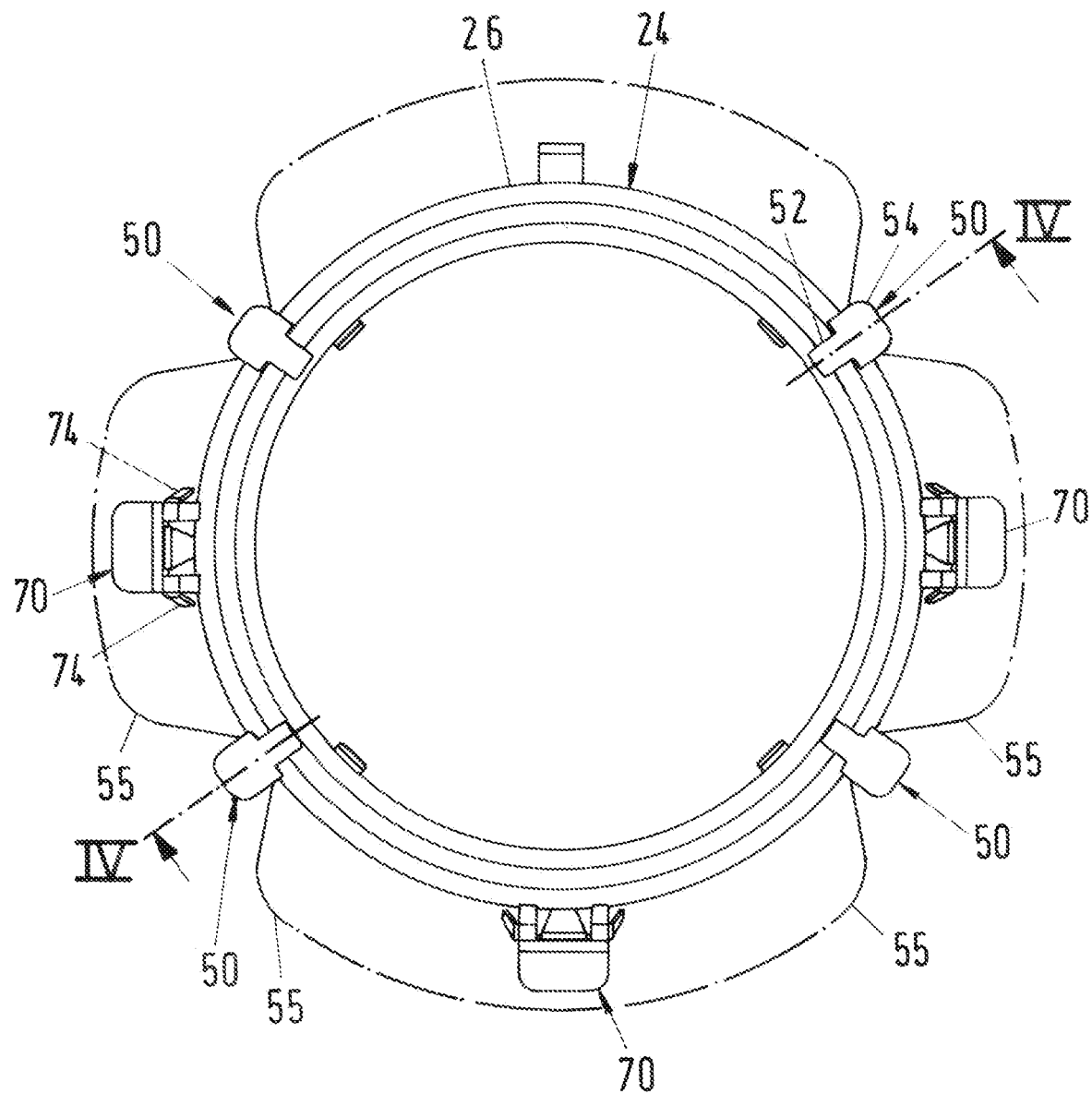
FIG. 3 a top view of the ring element.

The free-vibrating section 54 projects radially outward, which can be seen in particular in the top view according to FIG. 3. In other words, each free-vibrating section 54 extends approximately in the direction of the intersection between the transverse center plane Q10 and the longitudinal center axis L. The free-vibrating sections 54 serve as guide elements in the manner of a funnel to center a pipe end to be inserted. Each latching tab 50 also includes a latching section 52 which extends in the opposite direction to the free-vibrating section 54. The free-vibrating section 54 is stamped out of the intermediate section 57 and, as a stamped section, is therefore also monolithically formed with the latching tab 50. It can be seen that the first latching section 52 and the free-vibrating section 54 of each latching tab 50 are aligned with each other or lie in one plane.

The first latching section 52 is formed in a barb-like manner to exert a force acting in the direction of the transverse center plane Q10 of the profile clamp 10 on a flange of a pipe end. This allows the flange to be pre-positioned and held in this position. For this purpose, the first latching section 52 has a first contact edge 56 which is configured to make a point contact or line contact with the flange of the pipe end. The point contact or line contact is the only contact between the first latching tabs 50 and the flange of the pipe end. The first contact edge 56 of each latching section 52 transitions to a radius 58 on both sides.

The first latching section 50 is prestressed radially outward with respect to the ring body 26 so that the ring body 26 can bear against the inner contour 36 of the clamp band 14, where it is securely seated. The free-vibrating section 54 is arranged and configured to swing freely when the flange of the pipe end is engaged with the first latching section 52. As a result, a perceptible engagement noise is generated and amplified by the free vibration capability.

Each second latching tab 70 includes a second latching section 72 adapted to latchingly engage a flange of a pipe end via a second contact edge 76, and a respective wing section 74 on either side thereof for producing a frictional engagement with a flange of the pipe end. The wing sections project in the direction of the longitudinal center axis L and run parallel thereto.

Furthermore, guide lugs 38 are arranged on the ring body 26, which project in a tilted manner with respect to the longitudinal central axis L and which project radially inwards and can center both pipe ends with respect to the longitudinal central axis L. The ring element 24 can be manufactured based on a sheet-like workpiece. The latching tabs 50 and 70, as well as the guide lugs 38, are formed integrally with the ring element 24 and may be produced by stamping and forming.

Figure 4:
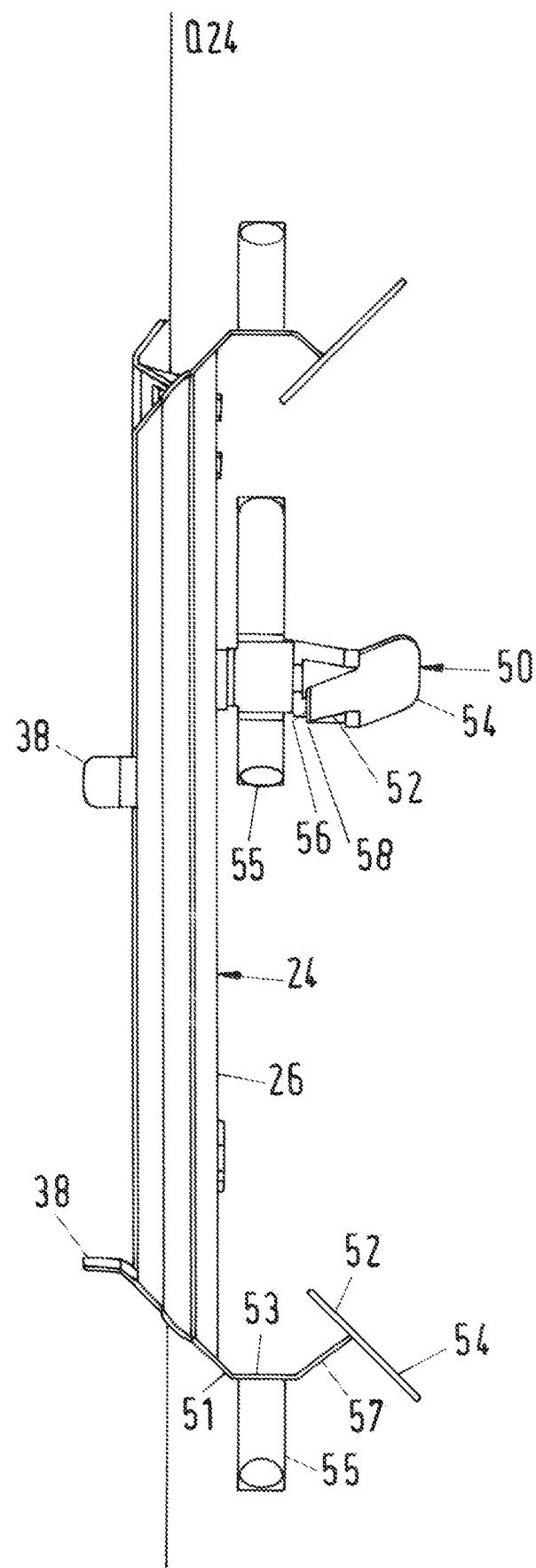
FIG. 4 a sectional view through the ring element according to FIG. 3 along line IV-IV.

FIG. 4 now shows the ring element 24 with integrated sealing area 28, which forms a conically tapering extension of the ring element 24 extending in the axial direction. An inclination of the sealing area 28 corresponds approximately to the inclination on an inner side of the flange at the end of the pipe, such that it can abut the latter over its entire surface.

Figure 5:
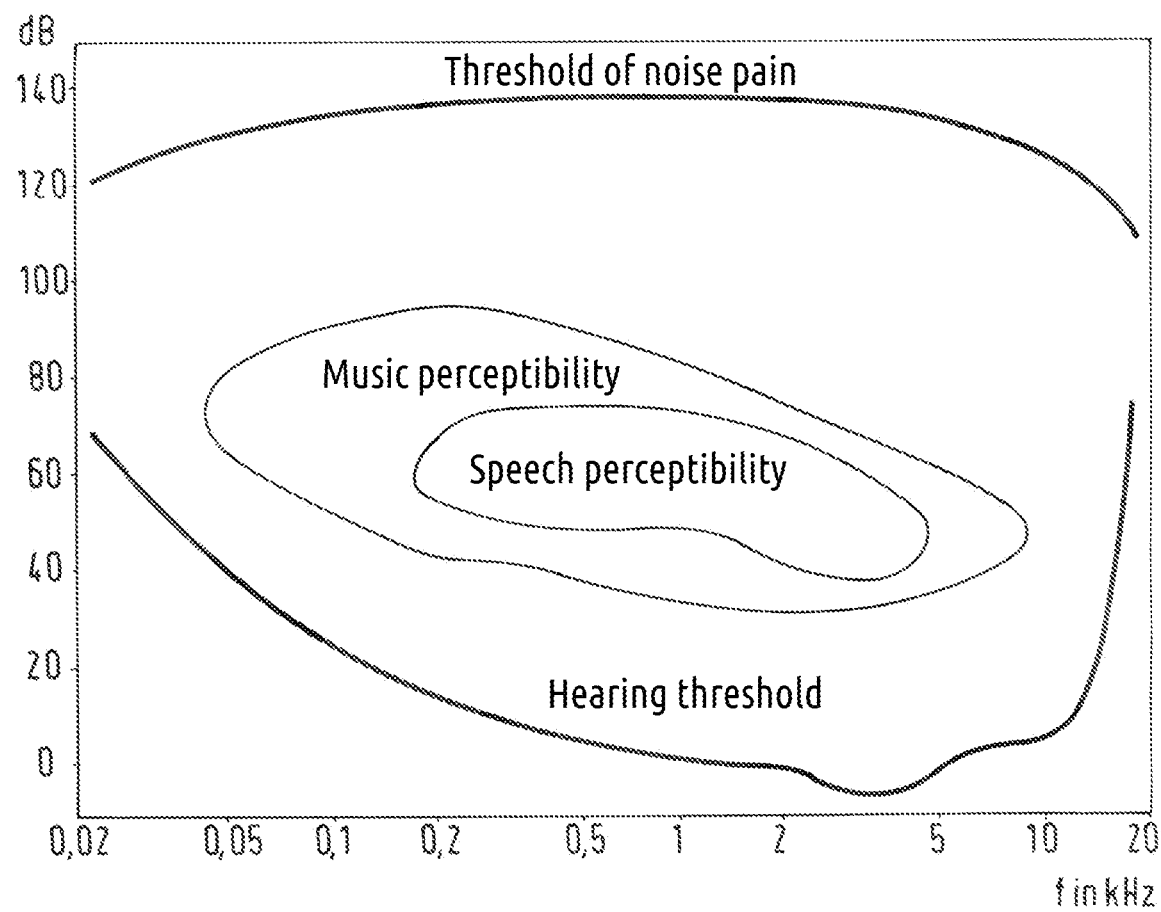
FIG. 5 a diagram of the human auditory surface.

FIG. 5 shows a diagram of the human hearing surface, with the sound pressure level [dB] plotted against the sound frequency f [kHz]. The engagement noise of the latches 50 and/or 70, which can be expressed as a "click sound", for example, should be above the hearing threshold, but preferably in the range of music perceptibility.

All features and advantages, including constructional details, spatial arrangements, and process steps, arising from the claims, the description, and the drawing may be essential to the invention both, individually and in a wide variety of combinations.

In order to avoid repetitions, features disclosed according to the device shall be considered as disclosed according to the method and shall be claimable. Likewise, features disclosed according to the method shall be considered as disclosed according to the device and shall be claimable.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Profile clamp
14 Clamp band
16 Tensioning head
18 Tensioning head
20 Tensioning element
23 Outer edge
24 Ring element
25 Inner edge
26 Ring body
28 Sealing area
36 Inner contour
38 Guide lug
50 first latching tab
51 Base section
52 first latching section
53 Stop section
54 Free-vibrating section
55 Support arm
56 first contact edge
57 Intermediate section
58 Radius
70 second latching tab
72 second latching section
74 Wing section
76 second contact edge
Q10 Transverse center plane of the profile clamp
Q24 Transverse center plane of the ring element
L Longitudinal center line

The invention claimed is:

1. Profile clamp with a clamp band and an annular ring element with a ring body, the clamp band having two tensioning heads which are connected to each other via a tensioning element, wherein the ring element comprises at least one first latching tab which is arranged projecting from the ring body in the axial direction of the profile clamp and protruding at least in sections from the clamp band, wherein the at least one first latching tab has a first latching section, wherein the first latching section is configured to exert a force acting on a flange of a pipe end in the direction of a transverse central plane (Q10) of the profile clamp, and the first latching section has a first contact edge which is configured to produce a point contact or line contact with the flange of the pipe end, wherein the first latching tab has a free-vibrating section extending in an opposite direction relative to the first latching section, wherein the first latching section and the free-vibrating section are aligned with each other and with respect to a longitudinal extent of the first latching tab such that no step or offset is formed between the first latching section and the free-vibrating section, wherein the free-vibrating section is configured to swing freely at least when the flange of the pipe end is latched with the first latching section, and a perceptible latching noise can be generated, amplified, or both generated and amplified via the free-vibrating section when the flange of the pipe end is latched with the first latching section, wherein the free-vibrating section protrudes from the clamp band and has a free end which is free in space, wherein the free end does not rest against the clamp band and does not interact with the clamp band.

2. The profile clamp according to claim 1, wherein the first latching section is formed as a section being cut out of the at least one first latching tab.

3. The profile clamp according to claim 1, wherein the first latching section is formed as a barb.

4. The profile clamp according to claim 1, wherein the first contact edge is formed to merge into a radius on one or both sides.

5. The profile clamp according to claim 1, wherein the at least one first latching tab is formed such that the point contact or the line contact is the only contact between the at least one first latching tab and the flange of the pipe end.

6. The profile clamp according to claim 1, wherein a second latching tab disposed on the ring body and having a second latching section and a second contact edge is provided, the second latching tab being configured to produce a perceptible latching sound at least when the flange of the pipe end is latched to the second latching section.

7. The profile clamp according to claim 6, wherein the first latching tab and/or the second latching tab is/are configured in such a way that the perceptible latching noise exceeds the human hearing threshold.

8. The profile clamp according to claim 1, wherein at least three spaced first latching tabs on at least one side of the ring body with respect to the transverse center plane (Q10) are provided.

9. A conduit connection arrangement having a conduit end on which a flange is formed, on which a profile clamp according to claim 1 is arranged.

10. The profile clamp according to claim 1, wherein the first latching section and the free-vibrating section together constitute a single planar construction with respect to each other and of the at least one first latching tab.

11. The profile clamp according to claim 1, wherein the first latching section and the free-vibrating section reside within the same and single plane with respect to each other.

12. A ring element having a ring body for a profile clamp, wherein the ring element comprises at least a first latching tab which is arranged projecting from the ring body in the axial direction of the ring element, the first latching tab having a first latching section, wherein the first latching section is configured to exert a force acting in the direction of a transverse center plane (Q24) of the ring member on a flange of a pipe end, and the first latching section has a first contact edge configured to make point contact or line contact with the flange of the pipe end, wherein the first latching tab has a free-vibrating section extending in an opposite direction relative to the first latching section, wherein the first latching section and the free-vibrating section are aligned with each other and with respect to a longitudinal extent of the first latching tab, such that no step or offset is formed between the first latching section and the free-vibrating section, wherein the free-vibrating section is configured to swing freely at least when the flange of the pipe end is latched with the first latching section, and a perceptible latching noise can be generated, amplified, or both generated and amplified via the free-vibrating section when the flange of the pipe end is latched with the first latching section, wherein the free-vibrating section protrudes from the clamp band and has a free end which is free in space, wherein the free end does not rest against the clamp band and does not interact with the clamp band.

* * * * *